April 18, 1944.　　　G. HALL ET AL　　　2,346,752
TRANSMISSION GEARING
Filed Jan. 9, 1943　　　3 Sheets-Sheet 1

Inventors:-
George Hall
and
Edgar Brierley

By Attorneys:-

April 18, 1944.　　　G. HALL ET AL　　　2,346,752

TRANSMISSION GEARING

Filed Jan. 9, 1943　　　3 Sheets-Sheet 3

Inventors:
George Hall
and
Edgar Brierley

By Attorneys:

Patented Apr. 18, 1944

2,346,752

UNITED STATES PATENT OFFICE 2,346,752

TRANSMISSION GEARING

George Hall and Edgar Brierley, Rochdale, England

Application January 9, 1943, Serial No. 471,824
In Great Britain September 10, 1941

5 Claims. (Cl. 74—117)

This invention refers to transmission gearing of the high ratio speed reduction type for transmission of rotation at infinitely variable speeds and including a set of levers or links pivotally connected in circumferentially spaced relationship to a strap mounted on a driving eccentric, each lever being pivotally connected at its outer end to a slide or saddle-piece fitted with two one-way locking devices of opposite hand, which are co-operative, respectively, with a fixed ring and a driven ring in such manner that the engagement points of simultaneously operating locking devices are always substantially diametrically opposite to each other on the circumference of the fixed ring and the driven ring, respectively, the engagement point on the driven ring always being at the throw side of the eccentric whereby there is effected a relatively large movement of the driven ring.

Figure 1:
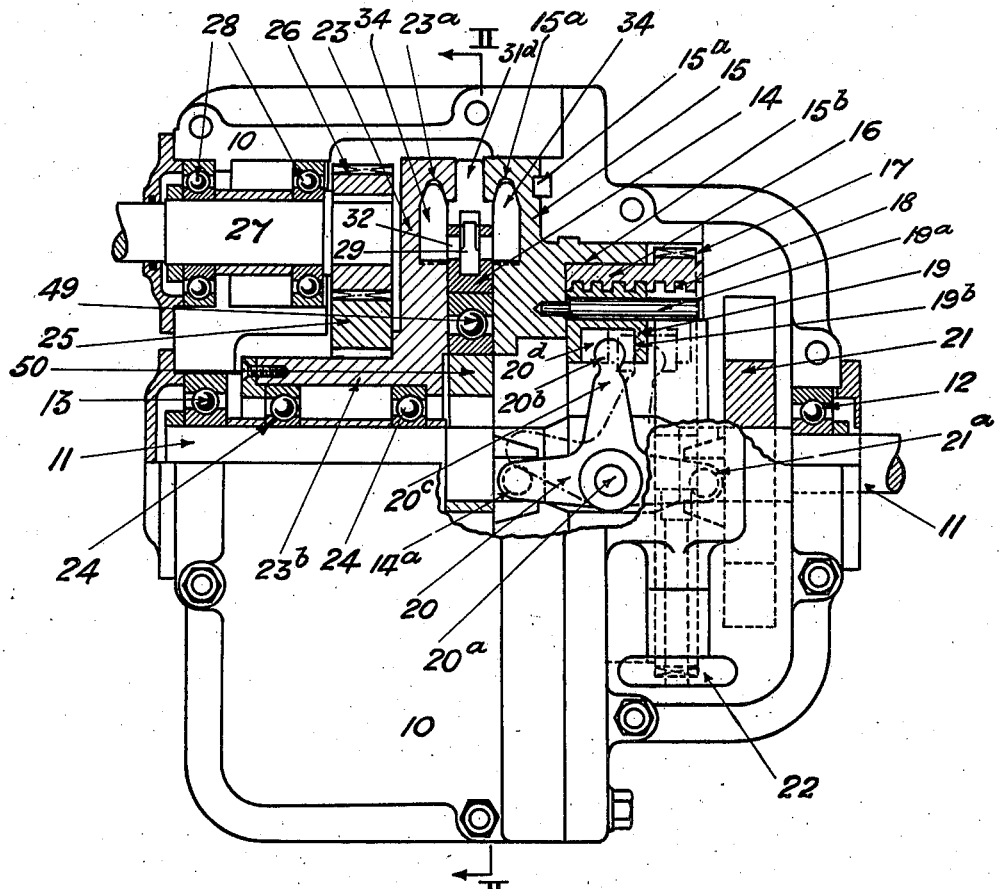
Figure 3:
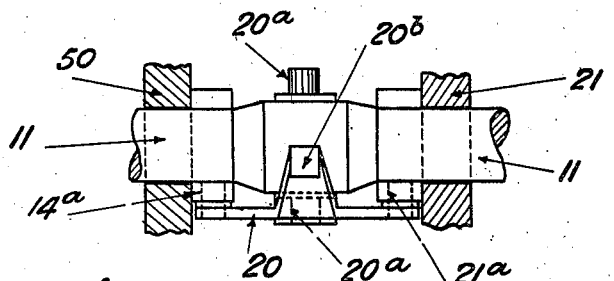
Figure 2:
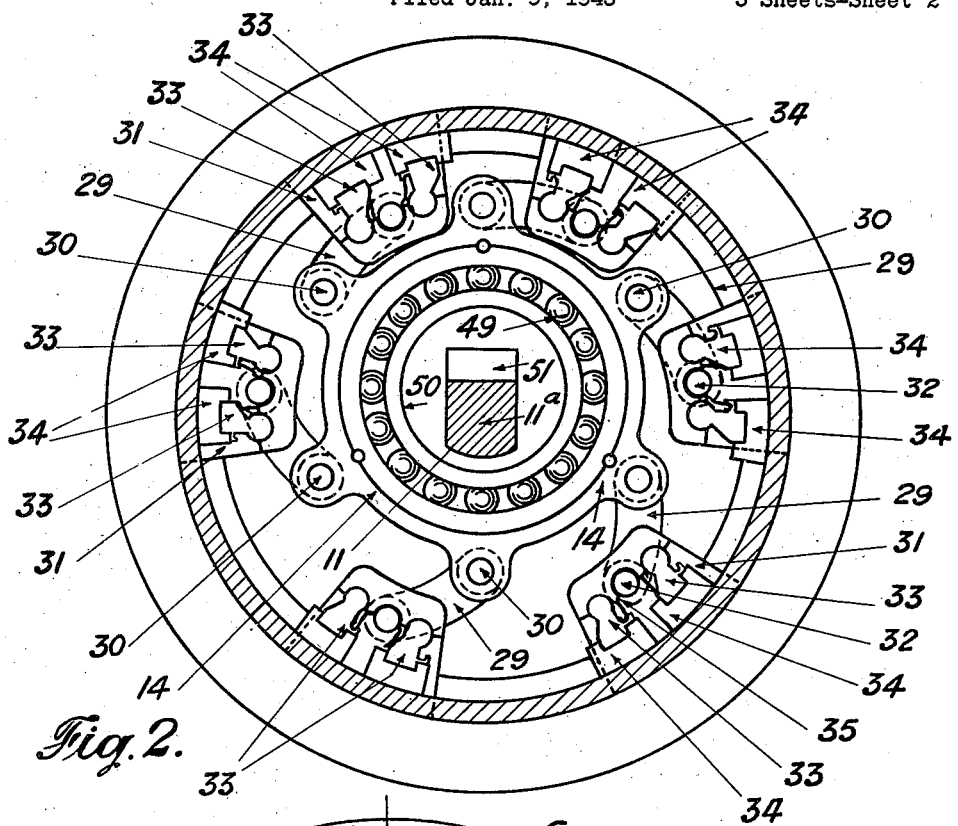
Figure 10:
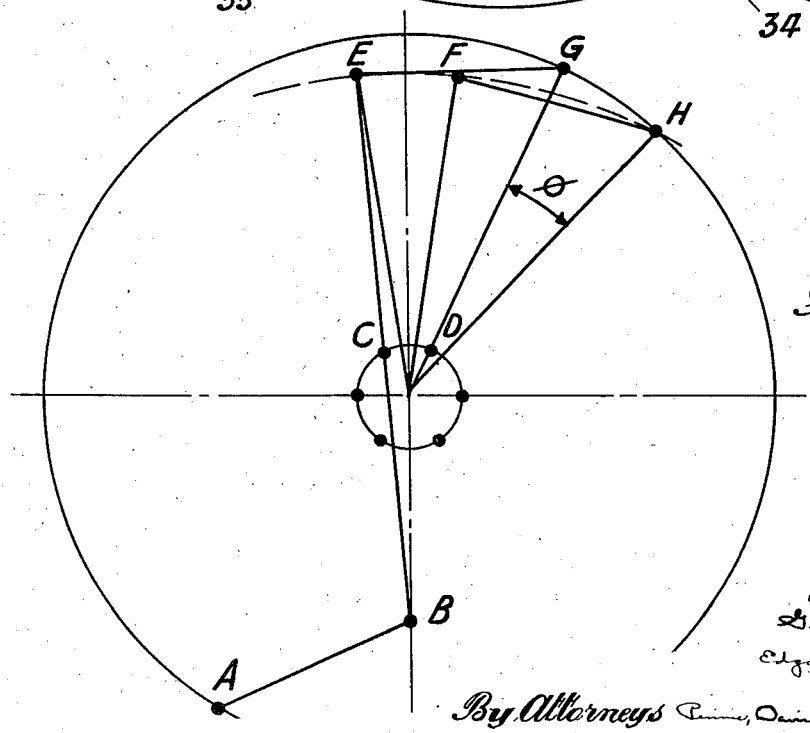
Figure 4:
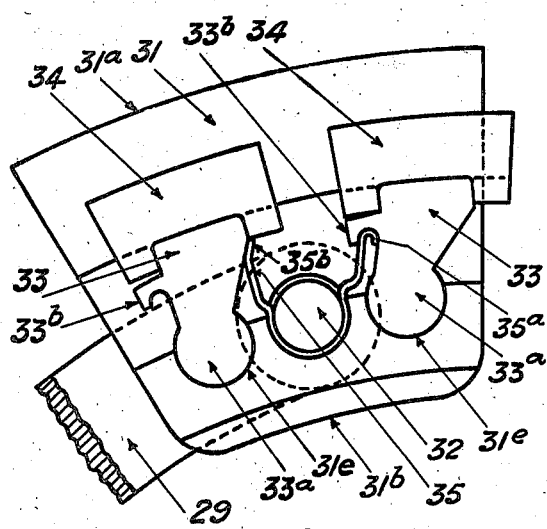
Figure 6:
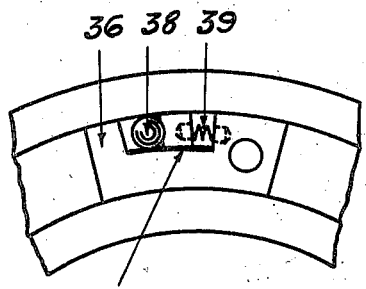
Figure 7:
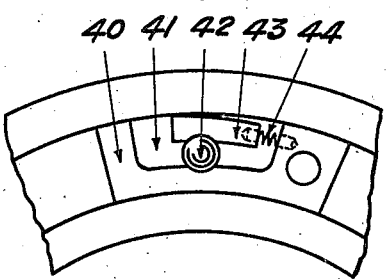
Figure 8:
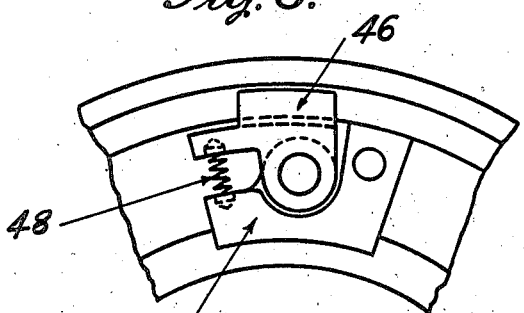

Description will now be given of some practical embodiments of the invention, reference being made to the accompanying drawings in which Fig. 1 is a sectional side view of a transmission gearing constructed according to one form of the invention. Fig. 2 is a vertical sectional view through the line II—II of Fig. 1 with part of the casing removed. Fig. 3 is a fragmentary plan view of a detail part of the gearing hereinafter referred to. Fig. 4 is a side view and Fig. 5 an end view, drawn to a larger scale, of shoes shown in Figs. 2 and 3 shown separate from the gearing. Fig. 6 is a fragmentary side view of a modified form of shoe. Fig. 7 is a similar view of a further modified form of shoe. Fig. 8 is a fragmentary side view and Fig. 9 a sectional view of a still further modified form of shoe, the plane of the section being through the line IX—IX of Fig. 8. Fig. 10 is a diagrammatic view showing the action of the transmission gearing.

The same reference characters indicate corresponding parts in the several figures of the drawings.

Referring to Figs. 1 and 2, the transmission gearing embodies a casing 10 providing housing for an input shaft 11 journalled at its ends in anti-friction bearings 12, 13 in the walls of said casing. A variable throw slotted eccentric 50 is mounted on the shaft 11 in driving connection therewith and is provided with a strap 14. The slot 51 of the eccentric engages a flat-sided part 11a of the shaft 11. A fixed ring 15 mounted in the casing 10 concentric with the input shaft 11 and secured against rotary movement as indicated at 15' is positioned in close proximity to one side of the strap 14. The ring 15 is formed in the face adjacent to the strap 14, with an annular groove 15a, and with an annular recess 15b in its opposite face. The recess 15b presents a bearing for the boss 16 of a hollow spur-wheel 17, said wheel being formed with an internal screwthread 18. A hollow disc member 19, formed with a screw-thread engaging the screw-thread 18, is restrained, by means of a peg 19a, against rotary movement with, but is capable of endwise movement relatively to, the spur-wheel 17. A control lever 20, pivoted at 20a on and straddling the input shaft 11, is in operative connection on one side with the eccentric 50 and on the other side with a balancing eccentric 21 carried by the input shaft 11, said connections being in the form of peg and slot connections as shown at 14a and 21a in Fig. 1. The control lever 20 is also in operative connection with the disc member 19 by means of an arm 20c which carries, at its free end, a block 20d in engaging an annular internal groove 19b in the disc member 19. As the disc member 19 is moved endwise relatively to the spur-wheel 17, when the spur-wheel 17 is revolved by a pinion, not shown, turned by means external to the casing 10, as by hand-wheel 22, Fig. 1, the control lever 20 rocks about its pivot 20a and moves the eccentric 50 bodily in its plane of rotation and so varies the throw of the said eccentric. A free ring 23 is freely mounted in anti-friction bearings 24 on the input shaft 11 in close proximity to the strap 14 on the side opposite to the fixed ring 15. The free ring 23 is formed with an annular groove 23a in its inner face and carries a gear wheel 25 which is keyed on the boss 23b of said free ring. The gear wheel 25 meshes with a pinion 26 keyed on an output shaft 27 which is journalled in anti-friction bearings 28 in the casing 10. The output shaft 27 is arranged in parallelism with the input shaft 11. A set of link or lever members 29, for example six, is provided. The levers 29 are pivoted at 30 in spaced relationship around the periphery of the strap 14. Each link or lever 29 is provided at its free end, with shoes or blocks 34 arranged on opposite sides of said link or lever, and hereinafter referred to as locking shoes or driving shoes. The shoes on one side of the levers are engageable in the groove 15a, in the fixed ring 15, and the shoes on the other side of the levers are engageable in the groove 23a in the free ring 23.

Figure 5:
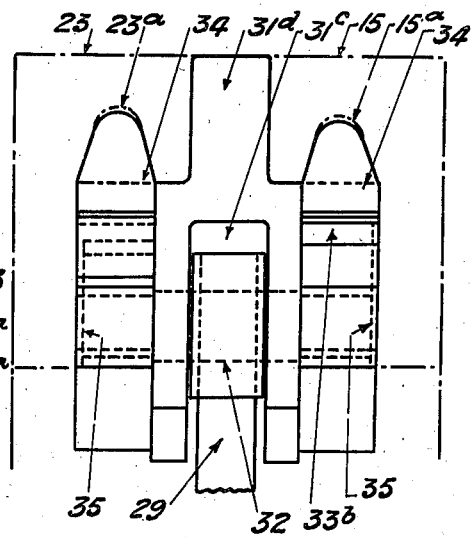

Figs. 2, 4 and 5 show the shoes in their preferred form. 31 is a slide or saddle piece of substantially inverted T shape in cross-section, see Fig. 5 and segmental in side view with tapering sides, see Fig. 4.

The radius of the outer curved edge 31a of the saddle piece corresponds to the outer radius of the fixed and free rings 15, 23, respectively, while the radius of the inner curved edge 31b is slightly greater than the radius of the strap 14. A groove 31c is formed in the saddle piece 31 extending longitudinally therethrough and cutting through the cross-member of the T and extending deeply into the vertical leg 31d of the T whereby the saddle piece may straddle a lever 29 in which it is pivotally secured by a pivot pin 32 penetrating said saddle piece and lever. The pivot pin projects on each side of the saddle piece for a purpose hereinafter explained. The cross-member of the T-shaped saddle piece 31 is formed in its outer surface with semi-circular grooves or recesses 31e, one pair of grooves 31e being equally spaced on opposite sides of the pivot pin 32 on one side of the saddle piece 31 and the other pair of grooves 31e being similarly disposed on the opposite side of said saddle piece.

Toggle levers 33 are provided, each toggle lever being formed with a rounded end 33a whereby it may be pivotally mounted in a groove 31e. The shape of the said groove is such as to retain the toggle lever against accidental displacement while permitting of a limited rocking movement of said toggle lever in said groove. Each toggle lever is curved on its upper edge and provides bearing for a shoe 34, the upper part of said shoe being shaped to correspond with the contour of the groove with which it is adapted to co-act. Each toggle lever 33 is formed on one side with an undercut projection 33b, and the opposite side of the toggle lever is inclined radially to the axis of the rounded end 33a. The pair of toggle levers 33 on one side of the saddle piece 31 are disposed with the undercut projections 33b on the left hand, while the pair of toggle levers on the opposite side of the saddle piece 31 are disposed with the undercut projections 33b on the right hand. Between each pair of toggle levers 33 there is arranged a leaf spring 35 embracing the respective projecting end of the pivot 32 and having two upwardly projecting arms. One of said arms is formed at its extremity with a curl 35a adapted to engage the under cut projection 33b on the adjacent toggle lever 33 while the extremity of the other arm of said spring is bent at its extremity 35b to engage the inclined side of the adjacent toggle lever 31, whereby to maintain the shoe blocks 34 in contact with the walls of the V groove. Each spring 35 is joggled so as firmly to grip the pivot pin 32, and prevent turning movement of the spring relatively to the pin.

The action of the spring 35 and the toggle levers 33 is to cause the shoes 34 to adapt themselves to the contour of the grooves 15a, 23a, respectively, as the strap 14 moves, to ensure that the maximum pressure of said shoes is exerted against the walls of the said grooves in the locking position due to the toggle action and that as the strap 14 moves the said shoes past the locking position the toggle levers rock slightly about the respective pivots to release quickly the grip of the shoes in the said grooves.

The projecting leg 31d of each T-shaped saddle piece 31 located between the adjacent faces of the fixed ring 15 and the free ring 23 serves as a thrust member.

As the eccentric 50 rotates clockwise (Fig. 2) with the input shaft 11, the shoes 34 on the lowermost link 29 of the locking set are caused to lock in the annular groove 15a in the fixed ring 15, whereupon said lever 29 acts as a fulcrum causing the shoes 34 on the uppermost lever 29 of the driving set to lock in the annular groove 23a in the free ring 23 whereby rotary motion is transmitted to the ring 23 and by way of the gear wheel 25 and the pinion 26 to the output shaft 27.

The action of the links 29 and the locking and driving shoes 34 may conveniently be described as follows:

Assuming the pivots 30 of the levers 29 to be in the positions around the eccentric 50 as in Fig. 2 corresponding to two, four, six, eight, ten and twelve o'clock, and looking at the outer face of the free ring 23, as viewed from the left hand end of Fig. 1 the locking shoes 34 on the link or lever 29 at four o'clock will be just beginning to lock in the groove 15a in the fixed ring 15, the locking shoes 34 on the lever 29 at six o'clock will be in full lock in said groove 15a, thus providing a fulcrum for the lever 29, while the locking shoes 34 on the lever 29 at eight o'clock will be coming free of the lock. It should be remembered that the direction of the grip of the locking shoes 34 in the fixed ring 15 is opposite to that of the driving shoes 34 in the free ring 23. Therefore the shoes 34 in the groove 23a of the free ring 23 on the links 29 at four, six and eight o'clock will be free. The driving shoes 34 on the lever 29 at ten o'clock in the free ring 23 are beginning the locking movement in the groove 23a, the driving shoes 34 on the lever 29 at twelve o'clock are in full lock in said groove, whereby the ring 23 is being driven, while the driving shoes 34 on the lever 29 at two o'clock are becoming free of the lock.

It will be understood that the locking shoes lock on the ring 15 when the pivot 30 of the corresponding lever 29 is approaching the ring 15, whereas the driving shoes lock on the ring 23 when the pivot 30 of the corresponding lever 29 is receding from the ring 23.

The locking and driving shoes may take various forms.

For example, as shown in Fig. 6 the shoes may each be in the form of a block 36 of curved formation on its outer and inner surfaces corresponding to the curvature of the outer and inner peripheries of the grooves 15a, 23a with slight clearance and having an inclined groove 37 in the outer face housing a hardened steel roller 38 urged by a spring 39 in one direction so that movement of the shoe in clockwise direction by its respective link 29 will cause the roller 38 to bind against the outer peripheral wall of the groove to lock the shoe in the groove.

In a further example as shown in Fig. 7 the shoe 40 may have a recess 41 housing a hardened steel roller 42 between which and the wall of the groove 15a or 23a is located a block 43 of slightly tapering form connected at one end by a spring 44 to the shoe 40 and adapted, when said shoe is moved by the link in clockwise direction, to become wedged between said roller 42 and the wall of the groove 15a or 23a, whereby to lock said shoe in said groove.

Figure 9:
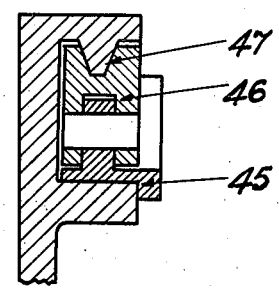

In a further example as shown in Figs. 8 and 9, a shoe 45 may have pivotally mounted thereon a saddle 46 having a V-shaped groove 47 in its outer surface adapted to engage a corresponding V-shaped ridge in the outer wall of the annular groove in the respective fixed or free rings and held in contact therewith by a spring.

48 interposed between the saddle 46 and the floor of the shoe 45, the saddle 46 being adapted to be forced into tight engagement with said V-shaped ridge when the shoe is moved in counter-clockwise direction by its respective lever. Movement of the shoe in the clockwise direction will free said saddle and shoe. The grooves of the fixed and free rings may, if desired, be provided with friction linings to ensure the shoes obtaining a firm grip.

Referring to Fig. 10 which shows diagrammatically the action of the gearing, A is a point on the fixed ring 15 which fixes a point B forming one of the six points 30 on the strap 14. The motion of the eccentric 50 moves the strap 14 through points C—D (with six links 29). This causes the link E. C. connected to the free ring 23 to move to position F. H., thereby turning the free ring 23 through the angle $\theta$. With six levers 29 the total output per revolution of the driving eccentric 50 equals $6\theta$.

Transmission gearing constructed as described provides a variable speed unit which is adjustable either while the gear is stationary or while it is in motion. Further, the rotating parts of the driving eccentric are balanced by means of the balancing eccentric 21. The construction of the transmission gearing as described is such as to permit of the input shaft 11 being journalled at both ends in anti-friction bearings 12, 13 while the output shaft 27 is journalled in the axially spaced anti-friction bearings 28, thereby ensuring smooth running of both shafts with freedom from whip. The driving eccentric may incorporate a standard ball bearing 49 interposed between the eccentric 50 and the strap 14.

The construction by which the levers 29 fulcrum on the fixed ring 15 ensures a powerful thrust action of the levers 29 on the free ring 23 to drive said free ring, and a high mechanical efficiency is obtainable.

We claim:

1. Gearing for transmission of power, including a rotary variable-throw eccentric, a strap journalled on said eccentric, coaxial fixed and driven rings on opposite sides of said eccentric, slides guided between said rings, a set of levers directly pivoted to said strap in circumferentially spaced relationship, and each pivoted at the outer end to a slide, and one-way acting locking devices of opposite hand fitted to each slide and intermittently operatively engageable, respectively, with said fixed ring and said driven ring, the points of said rings which are simultaneously operatively engaged being substantially diametrically opposite one another, and the engagement points on said driven ring always being at the throw side of said eccentric.

2. Transmission gearing of the high ratio speed reduction type for the transmission of power at variable speeds, comprising a casing, rotatable input and output shafts both carried by said casing, a pair of axially spaced rings, one ring rotatably mounted on said input shaft and the other ring fixed to said casing, slides guided between said rings, an eccentric carried by said input shaft and interposed between said rings, means for varying the eccentricity of said eccentric, a strap journalled on said eccentric, a set of levers directly pivoted to said strap in circumferentially spaced relationship, each lever pivotally connected at its outer end to a slide, oppositely acting pairs of toggle and shoe units pivoted to each slide, pairs of said shoes being intermittently operatively engageable, respectively, with said fixed ring and said rotatable ring, the engagement points of shoes operating simultaneously on said rotatable and fixed rings being always substantially diametrically opposite one another on the circumference of said rings, and the engagement points on said rotatable ring always being at the throw side of said eccentric, and means operatively connecting said rotatable ring with said output shaft.

3. Transmission gearing of the high ratio speed reduction type for transmission of power at variable speeds, including a rotary shaft, a driving eccentric on said shaft, means for varying the eccentricity of said eccentric, a strap journalled on said eccentric, a fixed ring and a driven ring on opposite sides of said eccentric, both rings coaxial with said shaft, slides guided between said rings, a single set of levers directly pivoted to said strap in circumferentially spaced relationship, and each pivotally connected at its outer end to a slide, oppositely acting pairs of toggle and shoe units pivoted to each slide, spring means influencing said toggles, pairs of shoes being intermittently operatively engageable, respectively, with said fixed ring and said driven ring, the engagement points of shoes operating simultaneously on said rotatable and fixed rings being substantially diametrically opposite one another on the circumferences of said rings, and the engagement points on said driven ring always being at the throw side of said eccentric, an output shaft, and means operatively connecting said driven ring with said output shaft.

4. Transmission gearing of the high ratio speed reduction type for the transmission of power at variable speeds, comprising a casing, rotatable input and output shafts both carried by said casing, a pair of axially spaced rings, one ring rotatably mounted on said input shaft and the other ring fixed to said casing and concentric with said input shaft, slides guided between said rings, an eccentric carried by said input shaft and interposed between said rings, means for varying the eccentricity of said eccentric, a strap journalled on said eccentric, a single set of levers directly pivoted to said strap in circumferentially spaced relationship, each lever also pivotally connected at its outer end to a slide, one-way locking devices of opposite hand movable relatively to each slide and intermittently operatively engageable, respectively, with said fixed ring and said rotatable ring, the engagement points of simultaneously operating locking devices being always substantially diametrically opposite one another on the circumferences of said rings, and the engagement points on said rotatable ring always being at the throw side of said eccentric, and means operatively connecting said rotatable ring with said output shaft.

5. Transmission gearing of the high ratio speed reduction type for the transmission of power at variable speeds, comprising a casing, rotatable input and output shafts both carried by said casing, a pair of axially spaced rings, one ring rotatably mounted on said input shaft and the other ring fixed to said casing and concentric with said input shaft, slides guided between said rings, an eccentric carried by said input shaft and interposed between said rings, means for varying the eccentricity of said eccentric, a strap journalled on said eccentric, a single set of levers directly pivoted to said strap in circumferentially spaced relationship, and each pivotally connected at its outer end to a slide, oppositely acting shoe and toggle units pivoted to each slide, said shoes being intermittently operatively engageable, respectively, with said fixed ring and said rotatable ring, and spring means influencing the shoe and toggle units, the engagement points of shoes operating simultaneously on the fixed ring and the rotatable ring being always substantially diametrically opposite one another on the circumferences of said rings, the engagement points on said rotatable ring always being at the throw side of said eccentric, and means operatively connecting said rotatable ring with said output shaft.

GEORGE HALL.
EDGAR BRIERLEY.